(12) United States Patent
Huang (10) Patent No.: US 9,767,058 B2
(45) Date of Patent: Sep. 19, 2017

(54) METHOD AND APPARATUS FOR SCALABLE LOW LATENCY SOLID STATE DRIVE INTERFACE

(75) Inventor: Yiren Huang, San Jose, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 1154 days.

(21) Appl. No.: 13/460,695

(22) Filed: Apr. 30, 2012

(65) Prior Publication Data
US 2013/0132643 A1 May 23, 2013

Related U.S. Application Data

(60) Provisional application No. 61/561,160, filed on Nov. 17, 2011.

(51) Int. Cl.
*G06F 12/02* (2006.01)
*G06F 13/40* (2006.01)

(52) U.S. Cl.
CPC ........ *G06F 13/4022* (2013.01); *G06F 13/409* (2013.01); *G06F 2213/0026* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 8,606,959 B2 | 12/2013 | Goyal et al. | |
| 8,966,172 B2 | 2/2015 | Malwankar | |
| 2001/0033245 A1* | 10/2001 | Campanale | G11C 7/1018 341/200 |
| 2004/0215903 A1 | 10/2004 | Barri et al. | |
| 2007/0234130 A1 | 10/2007 | Sullivan et al. | |
| 2008/0056300 A1 | 3/2008 | Williams | |
| 2008/0320209 A1* | 12/2008 | Lee | G06F 12/0246 711/103 |
| 2009/0106470 A1 | 4/2009 | Sharma et al. | |
| 2009/0207563 A1 | 8/2009 | Niino | |
| 2009/0240873 A1 | 9/2009 | Yu et al. | |
| 2010/0244142 A1* | 9/2010 | Katakura | 257/369 |
| 2011/0113426 A1 | 5/2011 | Kung et al. | |
| 2011/0185114 A1 | 7/2011 | Bolanowski | |
| 2011/0213921 A1* | 9/2011 | Yu | G06F 3/061 711/103 |

(Continued)

FOREIGN PATENT DOCUMENTS

| | | |
|---|---|---|
| CN | 101149664 A | 3/2008 |
| CN | 101763221 A | 6/2010 |
| EP | 0550164 A1 | 7/1993 |

OTHER PUBLICATIONS

Notification of Transmittal of the International Search Report and the Written Opinion of the International Searching Authority, of the Declaration for PCT/CN2012/084823, 10 pages.

(Continued)

*Primary Examiner* — Charles Rones
*Assistant Examiner* — Ryan Dare
(74) *Attorney, Agent, or Firm* — Slater Matsil, LLP (57) ABSTRACT

A solid state drive (SSD) apparatus including a plurality of solid state drives, a channel-interleaved interface operably coupled to the solid state drives, and a Peripheral Component Interconnect Express (PCIe) bridge operably coupled to the channel-interleaved interface.

26 Claims, 5 Drawing Sheets

(56) References Cited

U.S. PATENT DOCUMENTS

| | | |
|---|---|---|
| 2011/0264833 A1 | 10/2011 | Zhang et al. |
| 2012/0096211 A1* | 4/2012 | Davis et al. ................ 710/314 |
| 2012/0166699 A1* | 6/2012 | Kumar et al. ............... 710/306 |
| 2013/0024599 A1 | 1/2013 | Huang et al. |
| 2013/0135816 A1 | 5/2013 | Huang |
| 2013/0282944 A1 | 10/2013 | Shaw et al. |
| 2013/0335907 A1 | 12/2013 | Shaw et al. |

OTHER PUBLICATIONS

Wikipedia, "DDR SDRAM", http://en.wikipedia.org/wiki/DDR_SDRAM, Apr. 27, 2012, 9 pages.
Wikipedia, "FC-HBA API," http://en.wikipedia.org/wiki/FC-HBA_API, Apr. 12, 2012, 2 pages.
Wikipedia, "Interlaken (networking)," http://en.wikipedia.org/wiki/Interlaken_(networking), Feb. 6, 2012, 2 pages.
"Interlaken Protocol Definition; A Joint Specification of Cortina Systems and Cisco Systems," Revision 1.2, Oct. 7, 2008, 52 pages.
Wikipedia, "Switched fabric," http://en.wikipedia.org/wiki/Switched_fabric, Apr. 27, 2012, 2 pages.
Supplementary European Search Report, Europan Application No. 12848997, Applicant: Huawei Technologies Co., Ltd., dated Oct. 22, 2014, 7 pgs.

* cited by examiner

METHOD AND APPARATUS FOR SCALABLE LOW LATENCY SOLID STATE DRIVE INTERFACE

This patent application claims priority to U.S. Provisional Application No. 61/561,160, filed on Nov. 17, 2011, entitled "Method and Apparatus for Scalable Low Latency Solid State Drive Interface," which is incorporated by reference herein as if reproduced in its entirety.

TECHNICAL FIELD

The present invention relates to a method and apparatus for solid state drives, and, in particular embodiments, to a method and apparatus for a scalable low latency solid state drive (SSD) interface.

BACKGROUND

In recent years, NAND flash memory-based SSDs have been widely adopted in various applications where data access speed is needed. SSDs have reduced the traditional read latency from hard disk drive's multiple milliseconds to less than 100 microseconds. The traditional hard disk drive (HDD) interface like serial SCSI (SAS) or serial ATA (SATA) are no longer an appropriate fit for SSD due to their longer latency. Because of the increased speed of SSDs over HDDs, the traditional HDD interface is no longer suitable for SSD applications due to the low latency of SSDs.

SUMMARY OF THE DISCLOSURE

Technical advantages are generally achieved by embodiments of the present disclosure which provide a method and apparatus for solid state drive (SSD) storage access for improving SSD performance.

In an embodiment, a solid state drive (SSD) apparatus including a plurality of solid state drives, a channel-interleaved interface operably coupled to the solid state drives, and a Peripheral Component Interconnect Express (PCIe) bridge operably coupled to the channel-interleaved interface.

In an embodiment, a solid state drive (SSD) apparatus including a plurality of solid state drives, a channel-interleaved interface operably coupled to the solid state drives, and a plurality of Peripheral Component Interconnect Express (PCIe) bridges operably coupled to the channel-interleaved interface. Each of the PCIe bridges is configured to exchange data with each of the solid state drives through the channel-interleaved interface.

In an embodiment, a method of accessing data stored in a solid state drive includes interleaving a read command with a first portion of a write data command and a second portion of the write data command to form an interleaved command, sending the interleaved command to the solid state drive via an interleaved channel-based interface, and receiving the data from the solid state drive in response to the read command in the interleaved command.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that may be embodied in a wide variety of specific contexts. The specific embodiments discussed are merely illustrative and do not limit the scope of the disclosure.

Solid state drives (SSDs) lately have been increasingly adopted for use in computer systems, either as a cache of the hard disk drive (HDD) or as a direct replacement of the HDD. In such architectures, SSDs are increasingly used to increase access speed to stored or cached data, to reduce the size, weight, and power consumption profile of the system, and to reduce the access latency to the stored or cached data. SSD read latency, however, is reduced quite dramatically relative to traditional HDD read latency, and therefore the traditional HDD interface does not efficiently utilize the faster SSDs.

Figure 1:
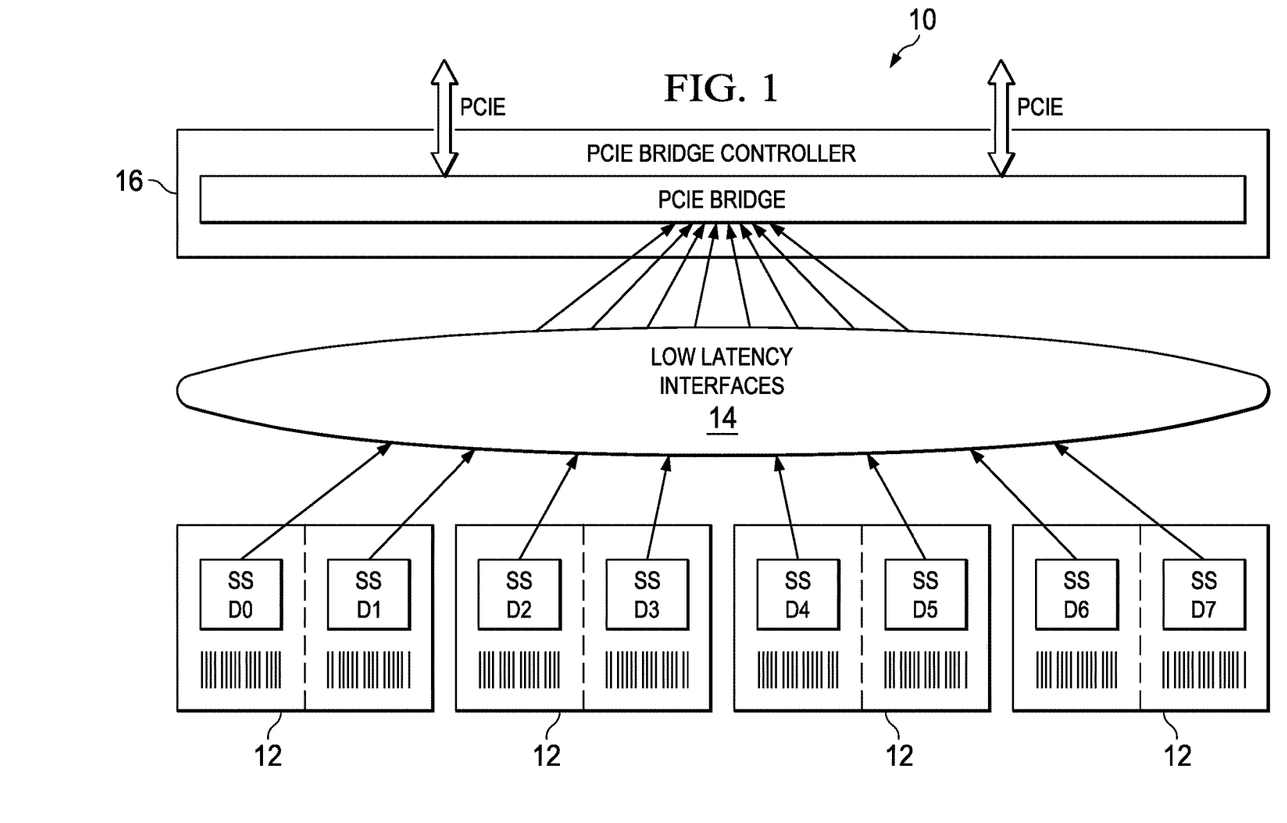
FIG. 1 illustrates an embodiment solid state drive (SSD) apparatus.

Referring now to FIG. 1, an embodiment SSD apparatus 10 is illustrated. As will be more fully explained below, the SSD apparatus 10 reduces the read latency for SSDs by using a low latency interface. By using a switching protocol low latency interface design, an embodiment will reduce the read access latency and scale up in capacity. Such a low latency interface also enables SSD design to be modular and allows the SSD module to be hot pluggable. The SSD apparatus 10 further permits the scalability of SSDs to many modules and many hosts. In addition, the low latency interface for the SSD provides a modular solution and scales up in size and performance based on a fabric switch in the interface. As shown in FIG. 1, in an embodiment the SSD apparatus 10 includes several SSDs 12, a channel-interleaved interface 14, and a Peripheral Component Interconnect Express (PCIe) bridge 16. As used herein, the PCIe bridge 16 may represent or be referred to as PCIe, a PCIe bridge controller, and so on.

The SSDs 12 in FIG. 1, which may also be referred to as a solid-state disk or electronic disk, are data storage devices that use integrated circuit assemblies as memory to store data persistently. The SSDs 12 do not employ any moving mechanical components, which distinguishes them from traditional magnetic disks such as hard disk drives (HDDs) or floppy disk, which are electromechanical devices containing spinning disks and movable read/write heads. Compared to electromechanical disks, the SSDs 12 are typically less susceptible to physical shock, are silent, have lower access time and latency, but are more expensive per unit of storage.

Still referring to FIG. 1, the SSDs 12 may use NAND-based flash memory, which retains data without power. For applications requiring fast access, but not necessarily data persistence after power loss, the SSDs 12 may be constructed from random-access memory (RAM). Such devices may employ separate power sources, such as batteries, to maintain data after power loss. The SSDs 12 may be organized using a redundant array of independent disks (RAID) format or scheme in nested levels such as, for example, RAID 16+1 and so on. While eight of the SSDs 12, which are labeled SS D0 to SS D7, are illustrated in the SSD apparatus 10 of FIG. 1, more or fewer of the SSDs 12 may be employed.

Still referring to FIG. 1, the channel-interleaved interface 14 is operably coupled to the SSDs 12. The channel-interleaved interface 14 functions as a low latency controller. As such, data and information retrieved from the SSDs 12 may be passed through the channel-interleaved interface 14. The channel-interleaved interface 14 may be otherwise known as or referred to as a fabric, a fabric switch, a switch, a switched fabric, and so on.

In an embodiment, the channel-interleaved interface 14 is an Interlaken interface, which is used as a low latency interface for SSD implementations. The Interlaken interface is a royalty-free high speed interface protocol that is optimized for high-bandwidth and reliable packet transfers. The Interlaken interface was created to connect networking ASICs together. The Interlaken interface provides a narrow, high-speed, channelized packet interface. The Interlaken interface has lower latency than the current SATA or SAS latencies. In an embodiment, the Interlaken interface is used to replace the traditional HDD interface, such as SATA or SAS. As will be more fully explained below, the Interlaken interface provides the advantage of a channel interleaved mode, which enables the SSD apparatus 10 to shorten the read latency.

The PCIe bridge 16 of FIG. 1 supports Peripheral Component Interconnect Express (a.k.a., PCIE, PCIe, or PCI Express), which is a computer expansion bus standard designed to replace the older PCI, PCI-X, and AGP bus standards. PCIe has numerous improvements over the aforementioned bus standards, including higher maximum system bus throughput, lower I/O pin count and smaller physical footprint, better performance-scaling for bus devices, a more detailed error detection and reporting mechanism, and native hot-plug functionality. More recent revisions of the PCIe standard support hardware I/O virtualization. As will be more fully explained below, the PCIe bridge 16 is operably coupled to, for example, a central processing unit (CPU) of a computer, server, tablet, smart phone, other electronic device.

Figure 2:
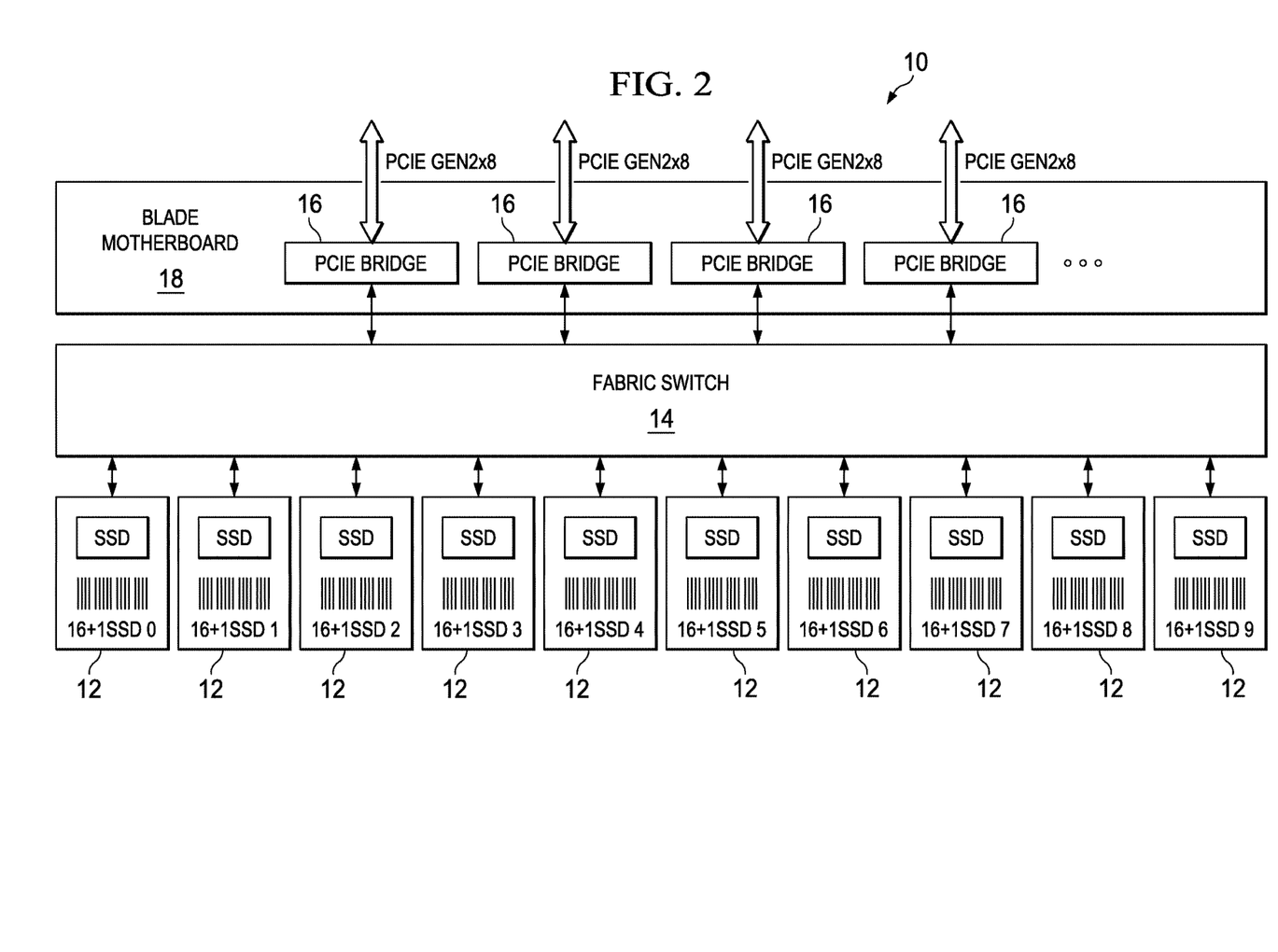
FIG. 2 illustrates an embodiment solid state drive (SSD) apparatus.

While a single PCIe bridge 16 is illustrated in the SSD apparatus 10 of FIG. 1, more or fewer of the PCIe bridges 16 may be employed. Indeed, referring now to FIG. 2, in an embodiment several of the PCIe bridges 16 are incorporated into the SSD apparatus 10. In an embodiment, the PCIe bridges 16 are collectively controlled by or disposed on a PCIe bridge controller 18. In an embodiment, the PCIe bridge controller 18 is a generation 2 blade motherboard. In FIG. 2, the PCIe bridge controller 18 has eight expansion slots. In other embodiments, different motherboards, controllers, and so on with more or fewer expansion slots may be employed.

The SSD apparatus 10 of FIG. 2 is a switched system of SSDs 12. In FIG. 2, there are multiple PCIe bridges 16 that each interface with one PCIe interface on one end and with one low latency switching interface of a fabric switch (i.e., the channel-interleaved interface 14) on the other end. The fabric switch may switch the read and write commands to the corresponding SSD 12 or the PCIe bridge controller 18.

Figure 3:
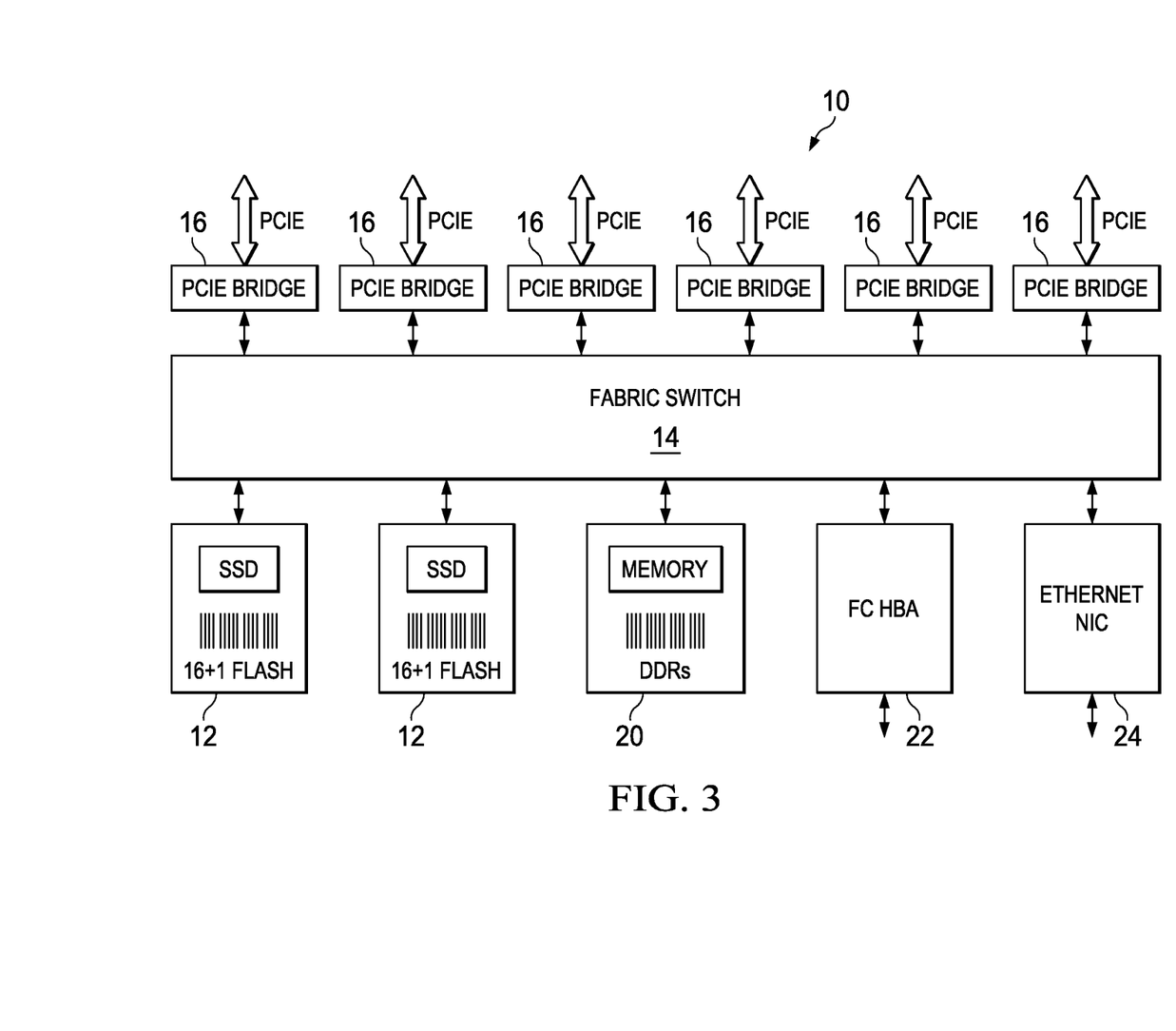
FIG. 3 illustrates an embodiment solid state drive (SSD) apparatus.

Referring now to FIG. 3, in an embodiment the SSD apparatus 10 includes several PCIe bridges 16 operably coupled to the channel-interleaved interface-based fabric switch 14. The channel-interleaved interface-based fabric switch 14 is also operably coupled to additional memory 20, a fiber channel network connection 22, and a network connection 24. The additional memory 20 may be, for example, static random access memory (SRAM), dynamic random access memory (DRAM), synchronous DRAM (SDRAM), non-volatile RAM (NVRAM), read-only memory (ROM), a combination thereof, or other types of memory.

The fiber channel network connection 22 may be, for example, an FC-HBA API (also called the SNIA Common HBA API). The FC-HBA API is an Application Programming Interface for Host Bus Adapters connecting computers to hard disks via a fiber channel network. The HBA API has been adopted by Storage Area Network vendors to help manage, monitor, and deploy storage area networks in an interoperable way. The network connection 24 may be, for example, an Ethernet network interface controller (NIC). The NIC, which is also known as a network interface card, network adapter, LAN adapter, and so on, is a computer hardware component that connects a computer to a computer network.

Figure 4:
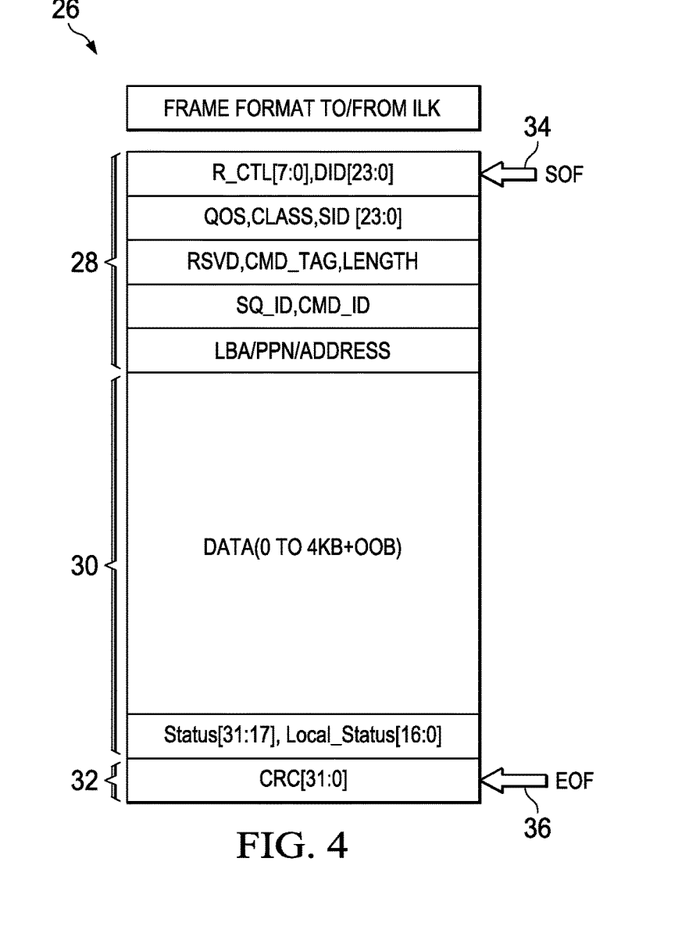
FIG. 4 illustrates a data frame format.

Referring now to FIG. 4, in an embodiment in order to use the Interlaken interface as the channel-interleaved interface 14 for SSD applications, a data frame format 26 as illustrated in FIG. 4 is defined. Indeed, the data frame format 26 permits the SSDs 12 to be switched using the Interlaken-based fabric switch. In an embodiment, the data frame format 26 includes a header region 28, a data region 30, and a cyclic redundancy check (CRC) region 32.

As shown in FIG. 4, in an embodiment the header region 28 is disposed proximate a start of frame (SOF) 34 of the data frame format 26. In an embodiment, the header region 28 includes or identifies numerous parameters such as, for example, a command code (R_CTL), a destination identification (DID), a quality of service (QOS), a type of command (CLASS), a source identification (SID), a command tag of the frame (CMD_TAG), a command length (LENGTH), a submission queue identification (SQ_ID), a command identification (CMD_ID), and a linear block address (LBA). The header region 28 may be configured to include more or fewer parameters or additional parameters relative to those illustrated in FIG. 4.

In an embodiment, the data region 30 follows the header region 28 in the data frame format 26. The data region 30 represents the portion of the data frame format 26 occupying data being transferred or exchanged by the SSDs 12 and the PCIe bridge 16 through the channel-interleaved interface 14. In an embodiment, the data frame format 26 also includes a cyclic redundancy check (CRC) region 32 proximate the end of frame (EOF) 36. The CRC region 32 contains parity or error check information or data. As such, the CRC region 32 offers protection over the whole frame.

Because the SSD apparatus 10 has a data frame format 26 with a source identification (SID) and a destination identification (DID), which can be used to switch the data to and from the proper sources and destinations, the SSD apparatus 10 may be described and utilized as a switched system.

Figure 5:
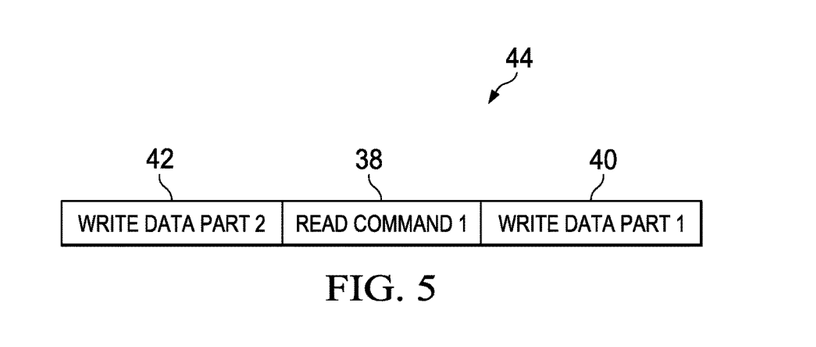
FIG. 5 illustrates interleaved read and write commands/data.

Referring now to FIG. 5, in an embodiment the channel-interleaved interface 14 (e.g., the Interlaken interface) interleaves a read command 38 and between a first portion of a write data command 40 and a second portion of a write data command 42 to collectively form an interleaved command 44. Indeed, because the write command is issued or sent in multiple bursts (e.g., the first and second portions of the write command 40, 42), the read command 38 may be inserted between the first and second portions of the write command 40, 42. This generally allows the read data to be obtained as soon as possible. By doing so, read access latency is reduced.

Embodiments of the SSD apparatus 10 may be used in PCIe SSDs, NVM express, PCIe storage blades in CDN iStream products, enterprise storage, and the like. An embodiment provides scalability that allows multiple host CPUs access to the PCIe SSD. Moreover, and the SSD apparatus 10 becomes switch friendly so that the SSDs 12 may be scaled up to multiple hosts and multiple devices by using a switch architecture.

Figure 6:
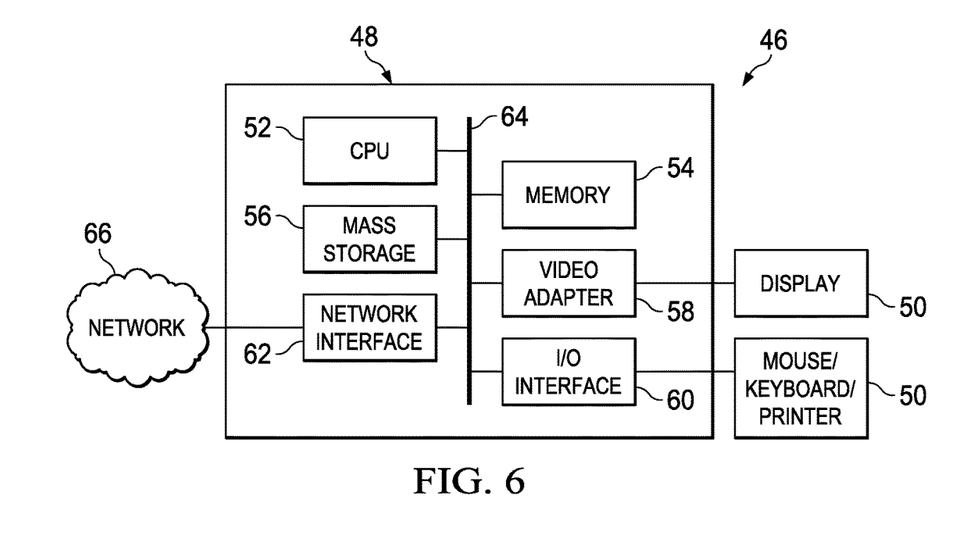
FIG. 6 is a block diagram illustrating a computing platform in which the methods and apparatuses described herein may be implemented, in accordance with various embodiments.

FIG. 6 is a block diagram of an embodiment computer system 46 in which the devices and methods disclosed herein may be implemented. Specific devices may utilize all of the components shown or only a subset of the components. In addition, levels of integration may vary from device to device. Furthermore, a device may contain multiple instances of a component, such as multiple processing units, processors, memories, transmitters, receivers, and so on.

The processing system 48 may be operably coupled to one or more input/output devices 50, such as a speaker, microphone, mouse, touchscreen, keypad, keyboard, printer, display, and the like. The processing system 48 may include a central processing unit (CPU) 52, memory 54, a mass storage device 56, a video adapter 58, an input/output (I/O) interface 60, and a network interface 62 connected to a bus 64.

The bus 64 may be one or more of any type of several bus architectures, such as PCIe, including a memory bus or memory controller, a peripheral bus, video bus, or the like. The CPU 52 may comprise any type of electronic data processor. The memory 54 may comprise any type of system memory such as static random access memory (SRAM), dynamic random access memory (DRAM), synchronous DRAM (SDRAM), non-volatile RAM (NVRAM), read-only memory (ROM), a combination thereof, or the like. In an embodiment, the memory 54 may include ROM for use at boot-up, and DRAM for program and data storage for use while executing programs.

The mass storage device 56 comprises one or more of the SSDs 12 or SSD apparatuses described above in FIGS. 1-3, and may be configured to store data, programs, and other information and to make the data, programs, and other information accessible via the bus 64. The mass storage 56 device may also comprise, for example, one or more of a hard disk drive, a magnetic disk drive, an optical disk drive, or the like.

The video adapter 58 and the I/O interface 60 provide interfaces to couple external I/O devices 50 to the processing system 48. As illustrated, examples of I/O devices 50 include the display coupled to the video adapter 58 and the mouse/keyboard/printer coupled to the I/O interface 60. Other devices may be coupled to the processing system 48, and additional or fewer interface cards may be utilized. For example, a serial interface card (not shown) may be used to provide a serial interface for a printer.

The processing system 48 also includes one or more network interfaces, which may comprise wired links, such as an Ethernet cable or the like, and/or wireless links to access nodes or different networks 66. The network interface 62 allows the processing system 48 to communicate with remote units via the networks. For example, the network interface 62 may provide wireless communication via one or more transmitters/transmit antennas and one or more receivers/receive antennas. In an embodiment, the processing system 48 is coupled to a local-area network or a wide-area network for data processing and communications with remote devices, such as other processing units, the Internet, remote storage facilities, or the like.

Figure 7:
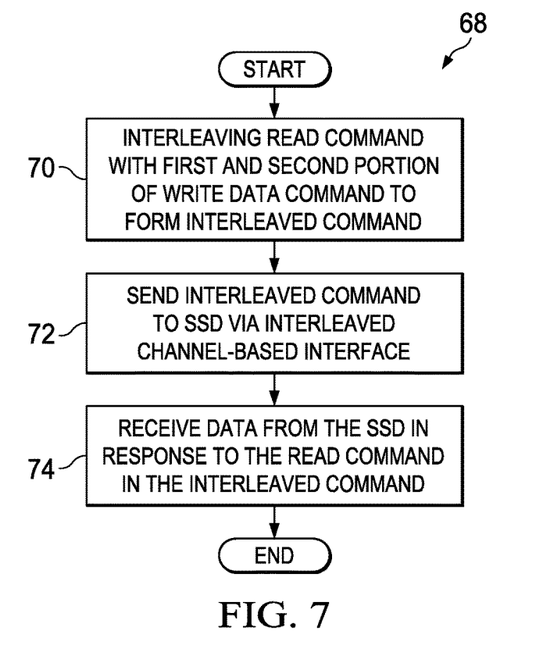
FIG. 7 is an embodiment method of accessing data stored in a SSD.

Referring now to FIG. 7, an embodiment of a method 68 of accessing data stored in a SSD 12 is illustrated. In block 70, a read command 38 (FIG. 5) is interleaved with the first portion of the write data command 40 and the second portion of the write data command 42 to form the interleaved command 44 (e.g., FIG. 5). In block 72, the interleaved command 44 is sent to the SSD 12 via an interleaved channel-based interface 14 as described herein and illustrated in FIGS. 1-3. Thereafter, in block 74, the data from the SSD 12 is received in response to the read command 38 embedded or incorporated in the interleaved command 44.

While the disclosure has been made with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A solid state drive (SSD) apparatus, comprising:
   a plurality of solid state drives;
   a channel-interleaved interface operably coupled to the solid state drives, the channel-interleaved interface configured to generate interleaved commands that include a first command sent on a first channel interleaved with a second command sent on a second channel in bursts, wherein the first command is sent between a first portion of the second command and a second portion of the second command; and
   a Peripheral Component Interconnect Express (PCIe) bridge operably coupled to the channel-interleaved interface such that the channel-interleaved interface is disposed between the plurality of solid state drives and the PCIe bridge and such that each solid state drive of the plurality of solid state drives communicates over the PCIe bridge by way of the channel-interleaved interface and using the interleaved commands, and wherein the channel-interleaved interface switches the interleaved commands between the solid states drives and the PCIe bridge according to source identification information and destination identification information in data frames of the interleaved commands.

2. The SSD apparatus of claim 1, wherein the channel-interleaved interface utilizes a data frame format including a frame header, frame data, and a frame cyclic redundancy check (CRC).

3. The SSD apparatus of claim 1, wherein the channel-interleaved interface generates the interleaved commands by interleaving a read command between portions of write commands.

4. The SSD apparatus of claim 1, wherein the second command is a write command, and wherein the channel-interleaved interface issues write commands in multiple bursts.

5. The SSD apparatus of claim 1, wherein the PCIe bridge is operably coupled to a PCIe bridge controller.

6. The SSD apparatus of claim 1, wherein a plurality of PCIe bridges are operably coupled to the channel-interleaved interface.

7. The SSD apparatus of claim 6, wherein the PCIe bridges are operably coupled to a blade motherboard.

8. The SSD apparatus of claim 1, wherein the channel-interleaved interface comprises a fabric switch.

9. The SSD apparatus of claim 1, wherein the channel-interleaved interface is operably coupled to a fiber channel network connection.

10. The SSD apparatus of claim 1, wherein the channel-interleaved interface is operably coupled to a network connection.

11. A solid state drive (SSD) apparatus, comprising:
a plurality of solid state drives;
a channel-interleaved interface operably coupled to the solid state drives, the channel-interleaved interface configured to generate interleaved commands that include a first command sent on a first channel interleaved with a second command sent on a second channel in bursts, wherein the first command is sent between a first portion of the second command and a second portion of the second command; and
a plurality of Peripheral Component Interconnect Express (PCIe) bridges, each of the PCIe bridges operably coupled to the channel-interleaved interface and such that the channel-interleaved interface is disposed between the plurality of solid state drives and the plurality of PCIe bridges, each PCIe bridge of the plurality of PCIe bridges configured to exchange data with each of the solid state drives through the channel-interleaved interface using the interleaved commands in the channel-interleaved interface; and
wherein the channel-interleaved interface is further configured to switch the interleaved commands between the solid states drives and the PCIe bridge according to source identification information and destination identification information in data frames of the interleaved commands.

12. The SSD apparatus of claim 11, wherein the channel-interleaved interface generates interleaved commands by inserting a read command after a first portion of a write command and before a second portion of the write command.

13. The SSD apparatus of claim 11, wherein the second command is a write command and wherein the channel-interleaved interface sends write commands to the solid state drives in discrete segment bursts.

14. The SSD apparatus of claim 11, wherein the plurality of PCIe bridges are operably coupled to a blade motherboard.

15. The SSD apparatus of claim 11, wherein the channel-interleaved interface comprises a fabric switch.

16. The SSD apparatus of claim 11, wherein the channel-interleaved interface is configured to exchange with the solid state drives data frames having a frame header.

17. The SSD apparatus of claim 11, wherein the channel-interleaved interface is configured to exchange with the solid state drives data frames having a frame cyclic redundancy check (CRC) frame.

18. The SSD apparatus of claim 11, wherein the channel-interleaved interface is operably coupled to a fiber channel network connection.

19. The SSD apparatus of claim 11, wherein the channel-interleaved interface is operably coupled to a network connection.

20. A method of accessing data stored in a solid state drive, the method comprising:
forming an interleaved command including a read command on a first channel that is sent from an expansion bus and that interleaved with a write data command on a second channel and that is sent from the expansion bus bridge in burst, wherein the read command is disposed between a first portion of the write data command and a second portion of the write data command;
sending the interleaved command to the solid state drive via an interleaved channel-based interface on the first channel and the second channel, the sending the interleaved command comprising switching the interleaved commands between the solid state drive selected from a plurality of solid state drives according to destination identification information in a data frame of the interleaved command; and
receiving the data from the solid state drive in response to the read command in the interleaved command, the data received from the solid state drive according to source identification information in the data frame of the interleaved command.

21. The method of claim 20, further comprising formatting a data frame to include a frame header.

22. The method of claim 21, further comprising formatting the data frame to include a cyclic redundancy check (CRC) header.

23. The method of claim 22, further comprising formatting the data into data frames disposed between the frame header and the CRC header.

24. The method of claim 20, further comprising sending the data received from the solid state drive to a PCIe bridge.

25. The method of claim 20, further comprising accessing a fiber channel network connection through the interleaved channel-based interface.

26. The method of claim 20, further comprising accessing a network connection through the interleaved channel-based interface.

* * * * *